MONEUSE & DUPARQUET.

Stove Grate.

No. 3,800. Reissued Jan'y 18, 1870.

Witnesses:

Chas H Smith

Geo: D. Walker.

Inventors:

Elie Moneuse

Louis Duparquet.

N. PETERS, Photo-Lithographer, Washington, D. C.

United States Patent Office.

ELIE MONEUSE AND LOUIS DUPARQUET, OF NEW YORK, N. Y.

*Letters Patent No.* 79,590, *dated July* 7, 1868; *reissue No.* 3,800, *dated January* 18, 1870.

STOVE-GRATE.

The Schedule referred to in these Letters Patent and making part of the same.

*To all whom it may concern :*

Be it known that we, ELIE MONEUSE and LOUIS DUPARQUET, of the city and State of New York, have invented, made, and applied to use a certain new and useful Improvement in Grates for Stoves and Ranges; and we do hereby declare the following to be a full, clear, and exact description of the said invention, reference being had to the annexed drawing, making part of this specification, wherein—

Similar marks of reference denote the same parts.

Figure 1:
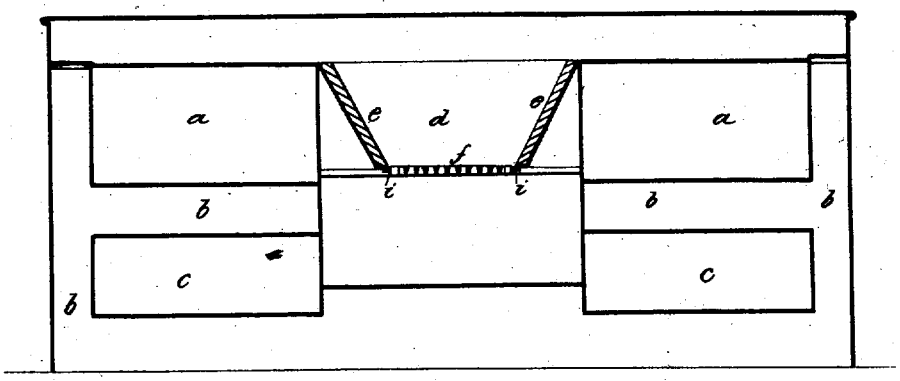
Figure 1 is a vertical longitudinal section of a range containing our improved grate.

This invention is intended to prevent the grate being accidentally dropped down while the fire is being raked.

It frequently happens, that in raking the fire, the latch that holds up the grate is pressed back, and the grate falls down, sometimes burning the cook, always making a dust and dirt, and sometimes seriously delaying the culinary operations in consequence of having to rebuild the fire.

To prevent the aforesaid contingency is the object of our invention, and we effect the same by the use of a latch that is connected with the catch that holds up the grate, therefore the catch cannot be moved until the latch has been unlatched; hence accidental tipping of the grate is effectually prevented.

In the drawing—

*a a* represent the ovens;

*b b*, the flues;

*c c*, the warming-ovens; and

*d*, the fire-place, lined with brick or soapstone *e*, as usual.

Figure 2:
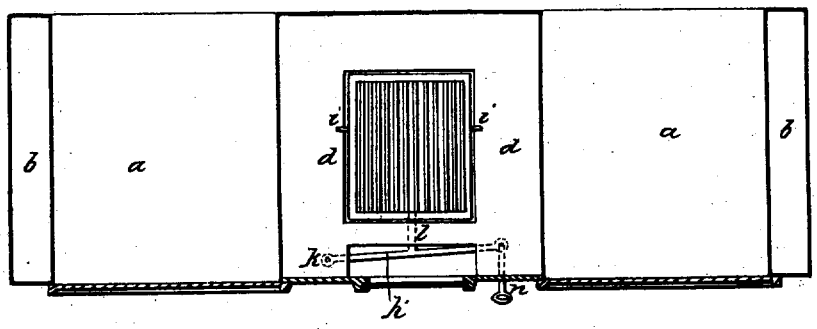
Figure 2 is a sectional plan, showing the grate, the latch, and the catch for the same.
Figure 3:
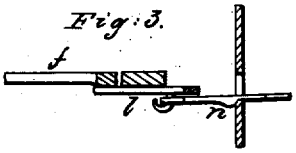
Figure 3 is a vertical section, showing the latch, catch, and grate.

In fig. 2, the fire-brick is shown as removed.

*f* is the grate, fitted to swing on the trunnions *i i*, so that the same may be dropped or tipped to empty the ashes and cinders previously to making the fire.

The arm *h* is shown with a projection that forms a catch, *l*, to hold up the grate. By the movement of this arm, the catch is withdrawn or replaced below the grate.

The arm *h* is shown as attached at one end by the pivot *k*.

*n* is a locking-link or latch, that is connected with this arm *h*, and passes through an opening in the front plate of the stove or range, and is provided with a catch or notch, by which it is retained in a locked position when the grate is supported by the catch, or, when the latch is lifted, the catch can be drawn from below the edge of the grate.

It will now be seen that the poker, in raking the fire, cannot move any of the parts that support the grate, and that before the grate can be tipped, the locking-link *n* has to be unlatched and moved to operate the catch *l*.

It will be evident that in cases where the trunnions *i i* are at the front and back portions of the grate, so that the grate tips sidewise, the catch should be placed so as to act at the side of the grate instead of the front.

What we claim, and desire to secure by Letters Patent, is—

1. The latch *n*, applied substantially as specified, to retain the catch that holds up the grate, or allow said catch to be moved when the latch is unlatched, as set forth.

2. The arm *h*, catch *l*, and latch *n*, in combination with the swinging grate, substantially as and for the purpose specified.

In witness whereof, we have hereunto set our signatures, this 30th day of November, A. D. 1869.

ELIE MONEUSE.
LOUIS DUPARQUET.

Witnesses :
E. S. CALDWELL,
G. SIMON.